(12) United States Patent
Anderson

(10) Patent No.: US 7,728,720 B2
(45) Date of Patent: Jun. 1, 2010

(54) SYSTEM AND METHOD FOR MONITORING A STATUS OF A MEMBER OF A VEHICLE

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 763 days.

(21) Appl. No.: 11/495,793

(22) Filed: Jul. 28, 2006

(65) Prior Publication Data
US 2010/0106428 A1    Apr. 29, 2010

(51) Int. Cl.
*B60Q 1/00*     (2006.01)
(52) U.S. Cl. ..................................... 340/438
(58) Field of Classification Search ................ 340/438, 340/428, 429, 440; 73/12.01
See application file for complete search history.

(56) References Cited

U.S. PATENT DOCUMENTS

| 4,361,805 A * | 11/1982 | Narimatsu et al. ..... 324/207.21 |
| 5,801,529 A * | 9/1998 | Umemoto et al. ...... 324/207.12 |
| 6,060,969 A | 5/2000 | Hufgard et al. |
| 6,205,866 B1 * | 3/2001 | Ullmann et al. ........ 73/862.333 |
| 6,282,942 B1 * | 9/2001 | Husby ........................ 73/12.04 |
| 6,670,805 B1 * | 12/2003 | Bahr et al. ................ 324/207.2 |
| 2002/0070728 A1 * | 6/2002 | Wesselak ............... 324/207.21 |
| 2002/0163426 A1 * | 11/2002 | Moskowitz ................. 340/426 |
| 2004/0129909 A1 * | 7/2004 | Wiese ................... 251/129.04 |

FOREIGN PATENT DOCUMENTS

| EP | 1096222 | 5/2001 |
| GB | 2197483 | 5/1988 |
| WO | 2004091978 | 10/2004 |

OTHER PUBLICATIONS

Magnetic Sensors, Giant Magneto Resistors. Product Brochure. Infineon Technologies. Jul. 2001.
European Search Report dated Nov. 12, 2007.

* cited by examiner

*Primary Examiner*—Phung Nguyen

(57) ABSTRACT

A system or method for monitoring a status of a member of a vehicle comprises a member of a vehicle. A set of one or more magnets is secured to the member. A magnetic field sensor is mounted on a vehicle, spaced apart from the member. The magnetic field sensor produces a data signal. A data processor receives the data signal from the magnetic field sensor and detects at least one of a deformation or movement of the member with respect to the vehicle.

28 Claims, 7 Drawing Sheets

SYSTEM AND METHOD FOR MONITORING A STATUS OF A MEMBER OF A VEHICLE

FIELD OF THE INVENTION

This invention relates to a system and method for monitoring a status of a member of a vehicle.

BACKGROUND OF THE INVENTION

A machine health monitoring system may monitor wear or the status of one or more components of a vehicle. Some members of a vehicle are ordinarily straight, such as axels and portions of a frame. If such members are bent or twisted from their ordinary straight state, the vehicle may not handle properly or perform reliably. Thus, there is a need for a machine health system or method to detect the movement or deformation (e.g., deflection or twisting) of one or more members of the vehicle.

SUMMARY OF THE INVENTION

A system or method for monitoring a status of a member of a vehicle comprises a member of a vehicle. A set of one or more magnets is secured to the member. A magnetic field sensor is mounted on the vehicle, spaced apart from the member. The magnetic field sensor produces a data signal that changes or indicates if the member is moved or deformed. A data processor receives the data signal from the magnetic field sensor and detects at least one of a present deformation (e.g., present deflection or present rotation) and present movement of the member with respect to the vehicle.

DESCRIPTION OF THE PREFERRED EMBODIMENT

Figure 1:
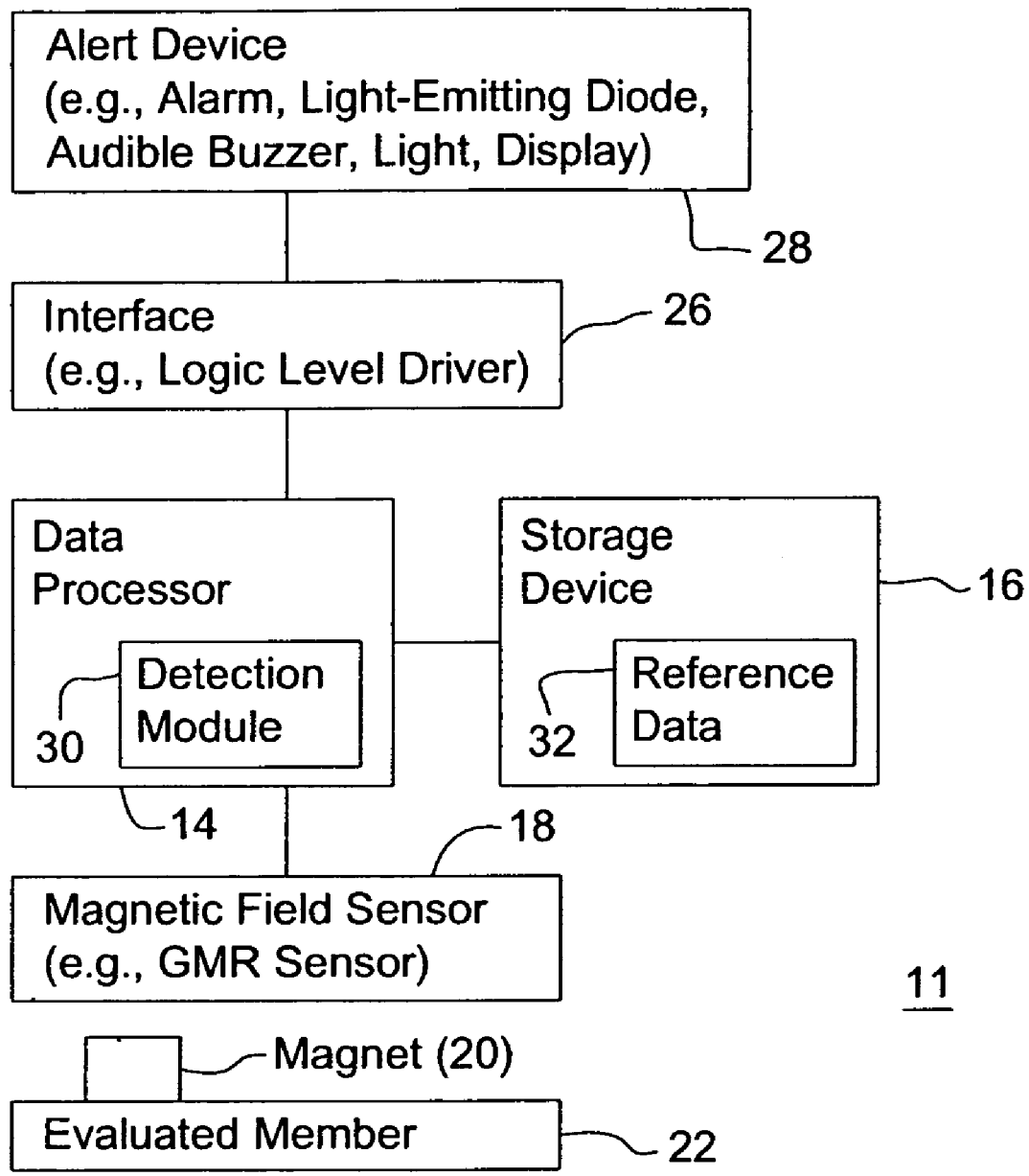
FIG. 1 is a block diagram of one embodiment of a system for monitoring the status of a member of a vehicle.

In FIG. 1, the monitoring system 11 for monitoring the status (e.g., machine health status) of an evaluated member 22 of a vehicle comprises a set of one or more magnets 20 attached or secured to the member 22. A magnetic field sensor 18 is spaced apart from the set of magnets 20 and the member 22. The magnetic field sensor 18 detects changes in the magnetic field caused by movement or change in the relative position of the member 22 to the magnetic field sensor 18. The magnetic field sensor 18 is coupled to a data processor 14. The data processor 14 may communicate with a storage device 16, an interface 26, or both. The data processor 14 is associated with a detection module 30 for comparing reference data 32 stored in the storage device 16 to measured sensor data detected or provided by the magnetic field sensor 18. The interface 26 supports communication between the data processor 14 and an alert device 28 for generating an alert or alarm for an operator of the vehicle concerning the status (e.g., machine health) of the member 22.

In one embodiment, the set of magnets 20 are spaced linearly along the member 22 at a spacing to provide a desired magnetic field at the magnetic field sensor 18. In another embodiment, one or more magnets 20 are arranged radially about a central axis to facilitate measuring of a rotational motion, speed, velocity or acceleration of a shaft (e.g., axle) of the vehicle.

In one configuration, the member 22 comprises a frame of the vehicle. In general, the frame may be configured as a full frame, an X-shaped frame, a ladder frame, a perimeter frame, or otherwise. In another configuration, the member 22 comprises a structural component of a unibody or unitized body construction of the vehicle. Unibody refers to construction of a vehicle without a frame that is generally prevalent in present day automobiles. In unibody construction, the body structure and the floor pan may be integral. In yet another configuration, the member 22 comprises an axle of the vehicle. In still another configuration, the member 22 comprises a shaft of the vehicle.

The member 22 may have a generally straight portion or have a curved portion with a known degree of curvature or relative position over a section of interest that is monitored by the monitoring system 11. The movement, deflection, or rotation of the normally straight portion or curved portion of the member 22 can be monitored to gain insight into the health of the evaluated member 22 and/or the entire vehicle.

A magnetic field sensor 18 may comprise a magneto-resistive sensor, a Hall effect sensor, a giant magneto-resistive (GMR) sensor, or another sensor or transducer that varies an electrical parameter (e.g., resistance, capacitance, inductance, impedance, voltage, or current) in response to a change in magnetic field strength or direction. A magnetic field sensor 18 is mounted on a vehicle, spaced apart from the member 22, and produces a data signal. A Hall effect sensor changes its output voltage in response to changes in the applied magnetic field strength from one or more magnets 20.

Although other sensors (e.g., Hall effect sensors or magneto-resistive sensors) may be used to practice the invention, the magnetic field sensor 18 may comprise a giant magneto resistor (GMR) sensor. In general, a giant magneto-resistor (GMR) sensor may be configured to measure a relative position of a member at a greater distance than a Hall effect sensor. In one embodiment, the GMR changes its resistance in response to a corresponding change in direction of the applied magnetic field, and does not change its resistance based on a variation in the field strength of the applied magnetic field. A GMR may be constructed from a series of alternating layers of hard magnetic layers. Two opposite ends of the alternating layers are capped by magnetic end caps (e.g., ferrous alloy or metal). One or more GMR's may be placed in a circuit, such as a resistive divider, a full bridge, or a half bridge, to produce a voltage output that varies with a corresponding change in direction of an applied magnetic field.

If the magnetic field sensor 18 provides a digital output, it may be coupled directly to the data processor 14 or via a data latch or buffer memory circuit, and possibly a logic level driver or converter. However, if the magnetic field sensor 18 provides an analog output, to interface a data processor 14, the analog output of the magnetic field sensor 18 may be fed into a comparator, an analog-to-digital (A/D) converter, or another interface circuit. The output of the ND converter or comparator may be fed into a logic level driver, a data latch or buffer memory to further interface with the data processor 14.

The data signal outputted by the magnetic field sensor 18 indicates whether or not a change has occurred in movement, relative position or separation of the sensor 18 with respect one or more magnets 20 on the member 22. If a change in movement, relative position or separation has occurred, the magnetic field sensor 18 may detect a change in the magnetic field provided by one or more of magnets 20. For example, the magnetic field sensor 18 may change its resistance or output voltage in proportion to the incident or received magnetic field (e.g., a respective change in field magnitude or direction) from the set of magnets 20.

In general, the data processor 14 may comprise a microprocessor, a digital signal processor, a microcontroller, a programmable logic device, a comparator circuit, a controller, or another data processor. A data processor 14 receives the data signal from the magnetic field sensor 18 and detects at least one of a present movement, deflection or present rotation of the member 22. In one configuration, data processor 14, the detection module 30, or both determine that a member 22 is exposed to a greater degree of mechanical stress or loading than desired if the present deflection exceeds a reference deflection (e.g., historical deflection which may be stored as reference data 32). In another configuration, the data processor 14, detection module 30, or both determine that a member 22 is exposed to a greater degree of mechanical stress or loading than desired if the present rotation exceeds the reference rotation (e.g., historical rotation which may be stored as reference data 32).

The detection module 30 may comprise software instructions, logic circuits, or another device to facilitate comparison of the measured sensor data (provided by the magnetic field sensor 18) to the reference data 32 to detect if the member 22 is materially deformed (e.g., deflected or twisted) relative to its normal state or rest state. In one embodiment, the detection module 30 may comprise an integrator or statistical analysis unit for detecting whether or not the member is deformed over one or more sample time periods (or over a suitable integration period). In one embodiment, the storage device 16 stores the reference data on a member 22, the member's position relative to the sensor 18, the member's movement relative to the sensor 18, or a reference magnetic field measurement. The reference measured magnetic field measurement may be defined in terms of the strength or magnitude of the magnetic field, and/or a direction or orientation of the magnetic field when the member 22 is under normal stress or no stress. The reference data 16 may comprise one or more of the following data or signals related to the member 22: as-designed positional data, as-manufactured positional data, as-designed movement data, as-manufactured positional data, a historical movement, a historical deformation, a historical deflection, a historical rotation, a reference deflection, a reference rotation, a reference movement, a maximum permitted deformation, a maximum permitted deflection, a maximum permitted movement per unit time, and a maximum permitted rotation, speed, acceleration, deceleration, or velocity. The storage device 16 may store or be programmed with "as-designed" or "as-manufactured" reference data on the proper relative position of the member 22 (e.g., at the magnet 20) to the sensor 18. Similarly, the storage device 16 may store or be programmed to store motion parameters (e.g., reference damping frequency, reference damping amplitude, or reference damping response) for a corresponding member 22 (e.g., suspension component), as-manufactured member motion parameters of corresponding member 22, and a history of in use motion measurements for a corresponding member 22.

The interface 26 supports the generation and transmission of an alert message or signal from data processor 14 to an alert device 28. The interface may comprise a driver, a display driver for driving a display (e.g., liquid crystal display panel), driver for generating a logic level output (e.g., transistor-to-transistor logic level output or complementary metal oxide semiconductor (CMOS) logic level output). The interface 26 may provide a ground closure output, a digital level output, or an analog output suitable for the alert device 28.

In one embodiment, the alert device 28 comprises an alarm, a light-emitting diode (LED), an audible alarm (e.g., piezoelectric buzzer), an audible oscillator, a light, a display, or another device for alerting an operator of the vehicle. For example the light or LED may be integrated into an instrument panel of the vehicle and may be illuminated to indicate the presence of an excessive movement or deformation of the member 22.

Figure 2:
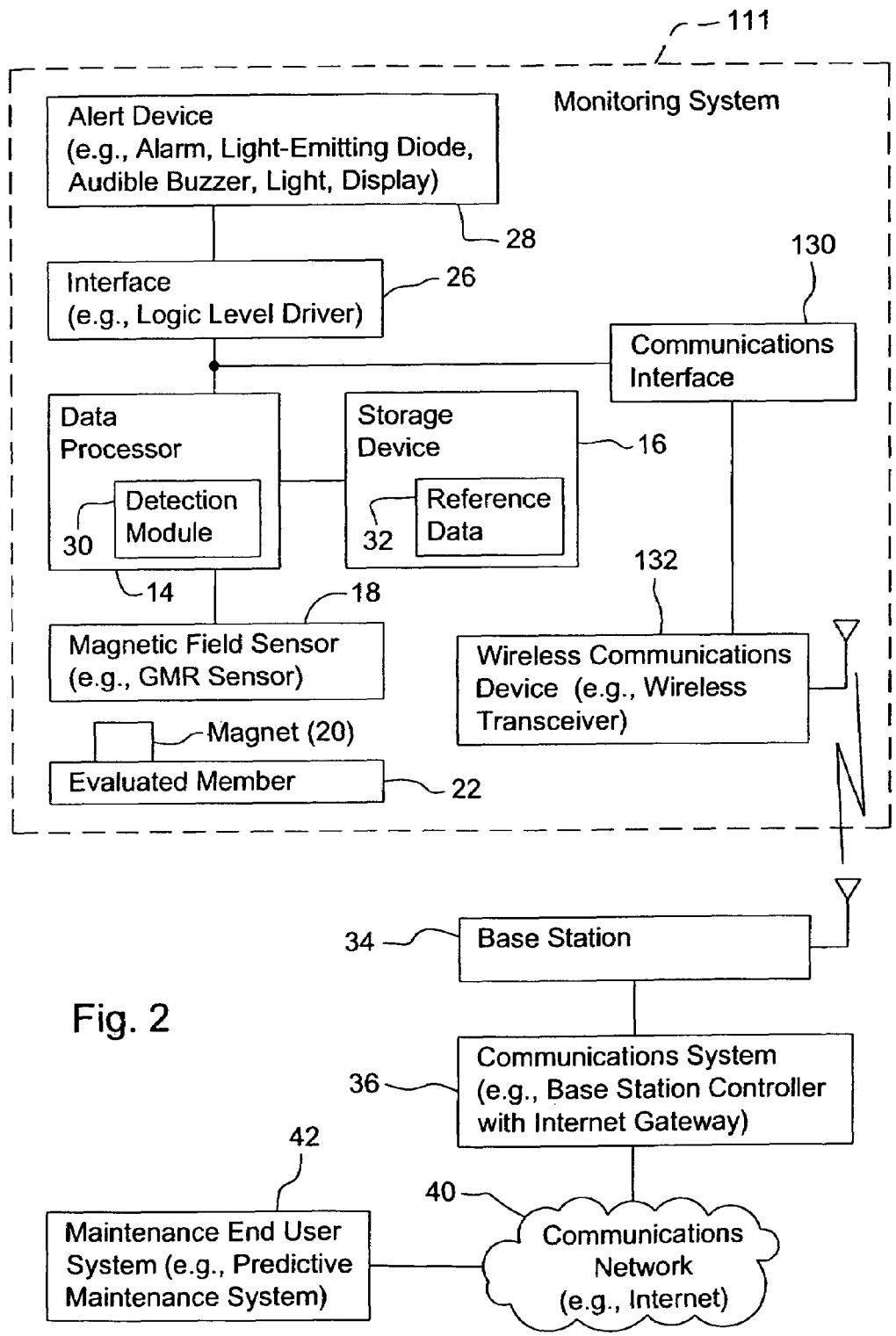
FIG. 2 is a block diagram of another embodiment of a system for monitoring the status of a member of a vehicle.

The monitoring system 111 of FIG. 2 is similar to the monitoring system 11 of FIG. 1, except the monitoring system 111 of FIG. 2 further includes a communications interface 130 and a wireless communications device 132 mounted on the vehicle. Further, the wireless communications device of the monitoring system is configured to communicate with a base station 34 via an electromagnetic signal (e.g., a radio frequency signal). In turn, a communications system 36 is coupled to the base station 34 and facilitations communication of one or more data messages over a communications network 40 (e.g. the Internet) to a maintenance end user system 42. Like reference numbers in FIG. 1 and FIG. 2 indicate like elements.

The communications interface 130 may comprise a buffer memory or other temporary data storage for storing data (e.g., status data messages on status of the member 22) prior to its transmission or receipt of an acknowledgement. The communications interface 130 supports communications between the monitoring system 111 and a maintenance end user system 42 via a wireless communications system 32 and a communications network 40.

The wireless communications device 132 may comprise a transceiver, a combination of a transmitter and a receiver, or another device capable of communicating over or through a wireless communications network or to a base station 34. The base station 34 may comprise any type of base station 34 including a trunking system base station or a cellular system base station. The base station may use code division multiple access (CDMA), time division multiple access (TDMA), global system for mobile communications (GSM), frequency modulation, amplitude modulation, spread spectrum modulation, phase shift keying, or another suitable modulation technique for reception and/or transmission of the electromagnetic signals. The base station 34 is coupled to a communications system 34. In one embodiment, the communications system 34 comprises a base station controller, or the combination of a base station controller and a mobile switching center (e.g., a circuit-switching configuration, a packet-switching configuration or a hybrid configuration). The communications system 36 supports communication of data messages from the base station 34 to the maintenance end user over the communications network 40 (e.g. Internet.)

The communications network 40 may comprise the Internet, a public switched telephone network, a data packet network, a communications link, a virtual private line, or the like.

The maintenance end user system 42 may comprise a computer system or a predictive maintenance system. The maintenance end user system 42 or a user may order applicable repair parts if the user receives a status message that a member 22 is materially deformed or in need of replacement. The maintenance end user system 42 may also be used for warranty compliance monitoring, to predict demand for spare parts or replacement parts, to develop forecasts for manufacturing new or replacement parts, to develop forecasts for demand for leases or purchases of vehicles, and to facilitate safety compliance of vehicles, and to eliminate or reduce downtime by replacing parts or vehicles prior to failure.

Although the monitoring systems (11 or 111) of FIG. 1 and FIG. 2 both show the magnet 20 mounted on the member 22 and the magnetic field sensor 18 spaced apart therefrom, in an alternate embodiment, the reverse configuration may be used and still fall within the scope of the invention. That is, the magnet 20 may be mounted on a primary structure or another portion of the vehicle and the magnetic field sensor 18 may be mounted on the member 22, spaced apart from the primary structure or the other portion.

Figure 3:
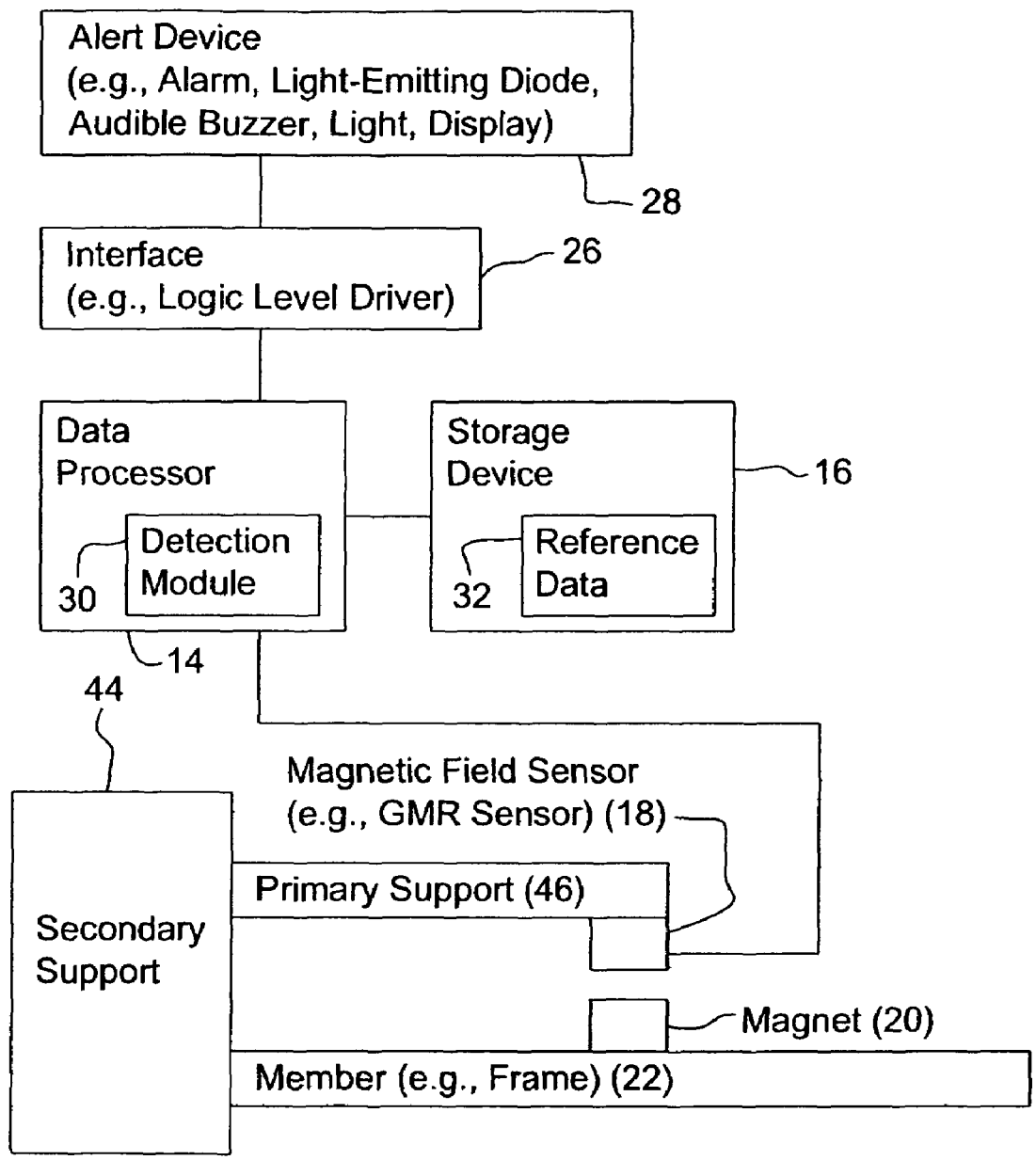
FIG. 3 is a block diagram illustrating one embodiment of the system installed on a vehicle.

FIG. 3 shows one embodiment of a monitoring system (11 or 111) installed on a vehicle. Like reference numbers in FIG. 1 and FIG. 3 indicate like elements. Only a portion of the vehicle is shown in FIG. 3, including a primary support 46, a secondary support 44, and a member 22 (e.g., deflecting member). The member 22 and the primary support 46 are affixed to, integral with, or attached to the secondary support 44. The magnetic field sensor 18 or the monitoring system (11 or 111) is secured to the primary support 46. The magnet 20 is secured to the member 22. A distance between the member 22 and the primary support 46 may change with stress or weight on the vehicle. For example, the member 22 may be forced downward if subjected to a payload in a truck bed, a hopper or container above the deflecting member 22; particularly, where the deflecting member 22 represents a frame of work vehicle.

Figure 4:
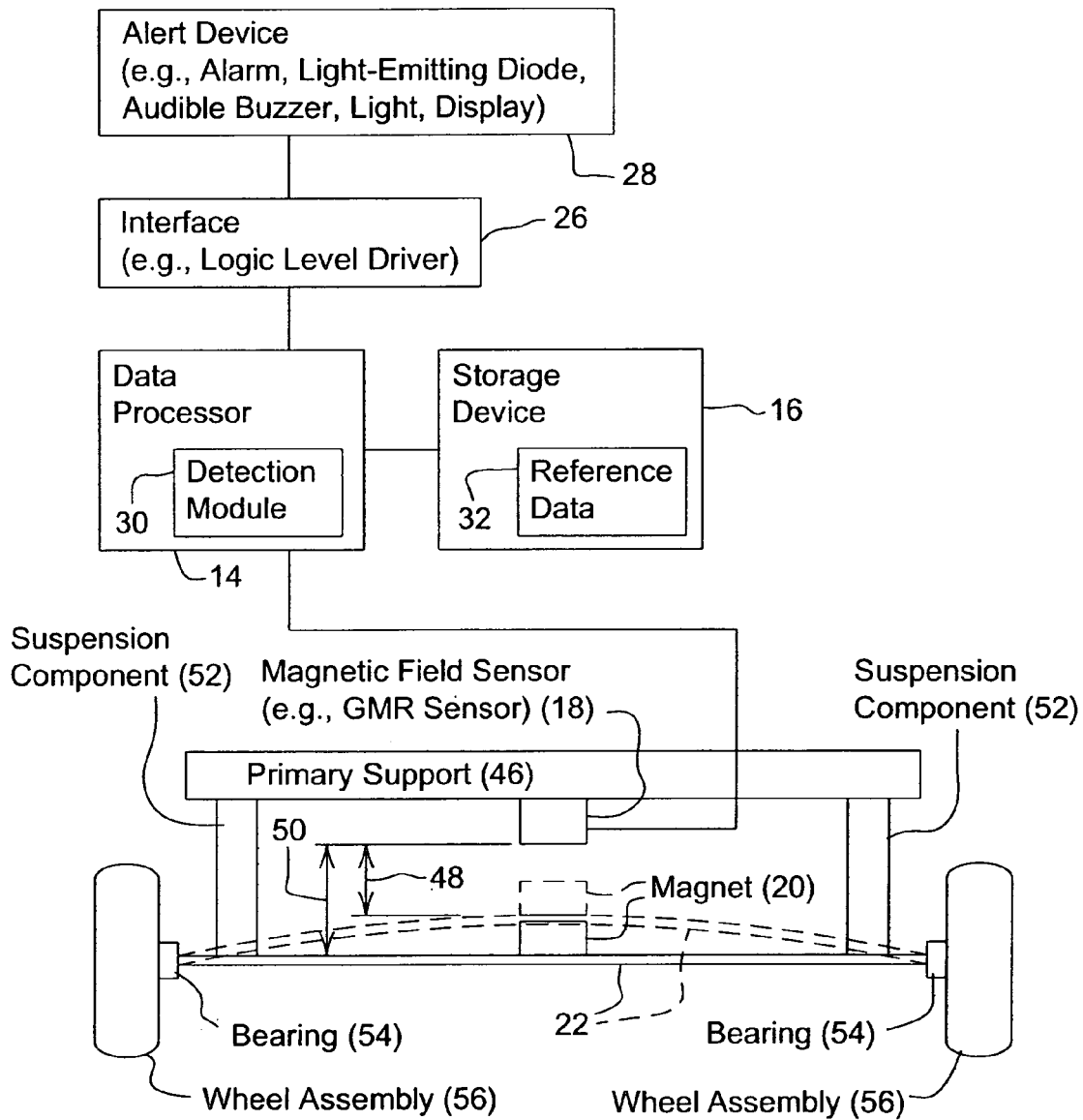
FIG. 4 is a block diagram illustrating another embodiment of the system installed on a vehicle.

FIG. 4 shows a monitoring system installed on a vehicle. Like reference numbers in FIG. 1 and FIG. 3 indicate like elements. Only a portion of the vehicle is shown in FIG. 4 including a primary support 46, a suspension component 52, a bearing 54, a wheel assembly 56, and an axle as the member 22. The magnet 20 is mounted on the axle or member in proximity to the magnetic field sensor 18. The magnetic field sensor 18 is affixed to or secured to the primary support 46 (e.g., frame). The suspension component 52 may comprise a spring, a strut, a shock absorber, a hydraulic cylinder, a pneumatic cylinder, a beam, or a generally rigid suspension component. One end of each suspension component 52 is connected to the primary support 46. The other end of the suspension component 52 is connected to the axle. Each end of the axle is associated with a bearing 54 and a wheel assembly 56. The bearing 54 supports rotational movement of the wheel assembly 56. The wheel assembly 56 may include a hub to which a wheel or rim mounts.

A magnet 20 is mounted on the axle to facilitate the detection of the bending of the member 22, where the member 22 comprises an axle or the suspension component 52. The sensor 18 measures a change in the magnetic field to detect bending of the axle or member 22 upward as shown by the dashed lines of FIG. 4. For certain types of magnetic field sensors 18, stronger magnetic field at the sensor 18 would indicate that the deflection or movement of the axle toward the frame, whereas a weaker magnetic field at the sensor would indicate the deflection of movement of the axle away from the frame. A change in the deflection or deformation of the member 22 or axle may indicate the presence of a heavy load, the weakening of the axle, or both. For monitoring the performance of the frame and axle, the magnetic field sensor 18 may be processed to track the quantity, frequency and magnitude of member 22 deflections.

Even if the axle does not bend or deform, the configuration of FIG. 4 may be used to measure the movement and response (e.g., damping response) of one or more suspension components 52, such as shocks or springs, or any combination thereof. The response or damping response of the suspension component may be defined in terms of measured amplitude (e.g., vertical position) versus time (e.g., decay time) in response to the vehicle riding over a hole or bump with known characteristics (e.g., hole depth, hole diameter, bump height, bump elevational profile, surrounding terrain definition) or measurements. The measured response (e.g., amplitude versus decay time or mechanical step response) is compared to a reference amplitude and corresponding reference decay time, or a reference attenuation response. The measured response or associated data may be compared with laboratory, fleet, or individual historical performance data to track a use history or dynamic performance that indicates condition-based maintenance should be performed prior to a failure while the vehicle is in use. If the measured attenuation response of the suspension component is deficient with respect to the reference attenuation response in damping rate, frequency, or amplitude; the operator may be alerted to a service technician or may be alerted to service a vehicle or replace the suspension component.

The monitoring system of FIG. 4 may also be used to determine axle rotation, wheel rotation, vehicle speed, wheel bearing performance, bearing failure, or the like. The multiple-uses of the monitoring system to monitor axle deformation, suspension performance, and axle rotation may reduce the cost of the monitoring system over one which uses multiple separate or independent sensors. The storage device 16 stores reference data for determining whether axle deformation, suspension performance, or axle rotation present any deficiency that requires maintenance or generation of a warning to a user of the vehicle.

For monitoring bearing failure of the bearing 54 or wheel bearing performance of the wheel assembly, the data processor 14 evaluates the waveform generated by magnetic field sensor 18 for deviations indicative of the axle sticking at one or more regions of its rotation. This sticking could be indicative of a failing bearing or some other form of localized friction. If a GMR sensor is used as the sensor 18 and a group of magnets 20 is arranged radially about an axis of rotation, the GMR sensor may produce a waveform that is generally sinusoidal, rectangular or triangular, depending upon the orientation of the GMR sensor with respect to the magnetic fields produced by one or more of the magnets 20.

Figure 5:
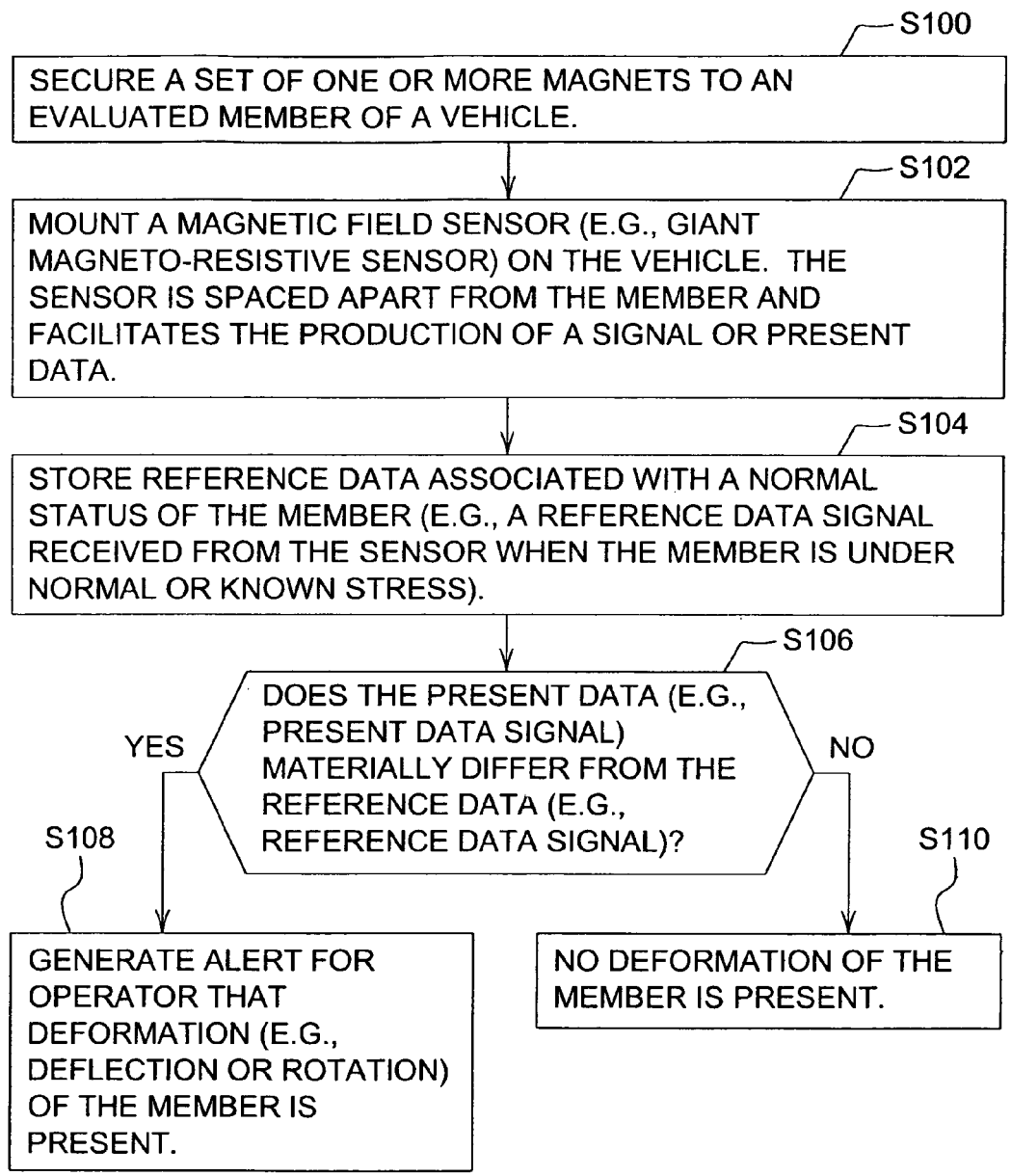
FIG. 5 is one embodiment of a method for monitoring the status of a member of a vehicle.

FIG. 5 shows a method for monitoring a status of an evaluated member 22 of a vehicle. The evaluated member 22 is monitored for its integrity, reliability, motion characteristics, performance or other status related to machine health. The method of FIG. 5 starts in step S100.

In step S100, a set of one or more magnets 20 is secured to an evaluated member 22 (e.g. an evaluated member) of a vehicle. In a first example, the member 22 comprises a frame of the vehicle or a structural portion of a vehicle of unibody construction. In a second example, the member 22 comprises an axle of the vehicle. In a third example, the member 22 comprises a shaft, a hub, a gear, pulley, wheel or a cylindrical member, and one or more magnets 20 (e.g., a set of magnets 20) is arranged radially about a central axis of the shaft, hub, gear, pulley, wheel or cylindrical member to facilitate measuring of a rotational speed or motion thereof.

In step S102, a magnetic field sensor 18 is mounted on the vehicle. The magnetic field sensor 18 is spaced apart from the member 22 and facilitates the production of a signal (e.g., present data signal) or present data. The data signal varies based on a relative position or separation of the sensor 18 with respect the set of magnets 20 on the member 22. In one embodiment, the magnetic field sensor 18 comprises a giant magneto resistive (GMR) sensor.

In step S104, a data processor 14 stores reference data associated with a normal or ordinary status of the member (e.g., a reference data signal received from or estimated to be received from the sensor 18 when the member 22 is under normal stress). The data processor 14 stores historical information on at least one of a historical deflection, a historical rotation, a reference deflection, and a reference rotation in a storage device 16 (e.g., memory, non-volatile memory, a hard-disk drive, a magnetic disk, an optical disk, or otherwise).

In step S106, the data processor 14, the detection module, or both determine whether the present data (e.g., present data signal) materially differs from the reference data (e.g., reference data signal). If the data processor 14, the detection module 30 or both determine that the present data differs materially from the reference data, the method continues with step S108. However, if the data processor 14, the second module or both does not determine that the present data differs materially from the reference data, the method continues with step S110.

Step S106 may be carried out by various techniques that may be applied alternately and cumulatively. Under a first technique, the present data materially differs from the reference data if the data processor 14 or detection module 30 determines that the member is exposed to a greater degree of mechanical stress or loading than desired. In accordance with the first technique, the data processor 14 or detection module 30 determines that the member 22 is exposed to a greater degree of mechanical stress or loading than desired if the present deflection exceeds the reference deflection (e.g., historical deflection). However, if the present deflection does not exceed the reference deflection or generally equals the reference deflection, the data processor 14 or detection module 30 may determine that the member 22 is exposed to a normal operational degree (e.g., an acceptable level) of mechanical stress or loading.

Under a second technique, the present data materially differs from the reference data signal if the data processor 14 or detection module 30 determines that the member is exposed to a greater degree of mechanical stress or loading than desired. Under the second technique, the data processor 14 or detection module 30 determines that the member 22 is exposed to a greater degree of mechanical stress or loading than desired if the present rotation (e.g., measured by angular displacement) exceeds the reference rotation (e.g., historical rotation). However, if the present rotation does not exceed the reference rotation or generally equals the reference rotation, the data processor 14 or detector may determine that the member 22 is exposed to a normal operational degree (e.g., an acceptable level) of mechanical stress or loading.

In step S108, the data processor 14 or an interface 26 generates an alert signal or alert message for an operator that material deformation (e.g., deflection or rotation) or movement of the member 22 is present. In one configuration, the alert message may indicate the magnitude and the duration of a change in the health status of the member (e.g. an axle) for further processing. In another configuration, the alert message may only communicate an alert that deformation is present or that the monitoring system (11 or 111) observed that a risk threshold was exceeded. In another configuration, the alert message may indicate that a time integrated load has been reached or exceeded for the member 22.

In step S110, the data processor 14 or an interface 26 does not generate an alert signal, alert message, alert data, or alarm data. Alternately, the data processor 14 or interface 26 may provide a status normal signal to the alert device 28 or provides a status normal signal because no deformation of the member is present.

Figure 6:
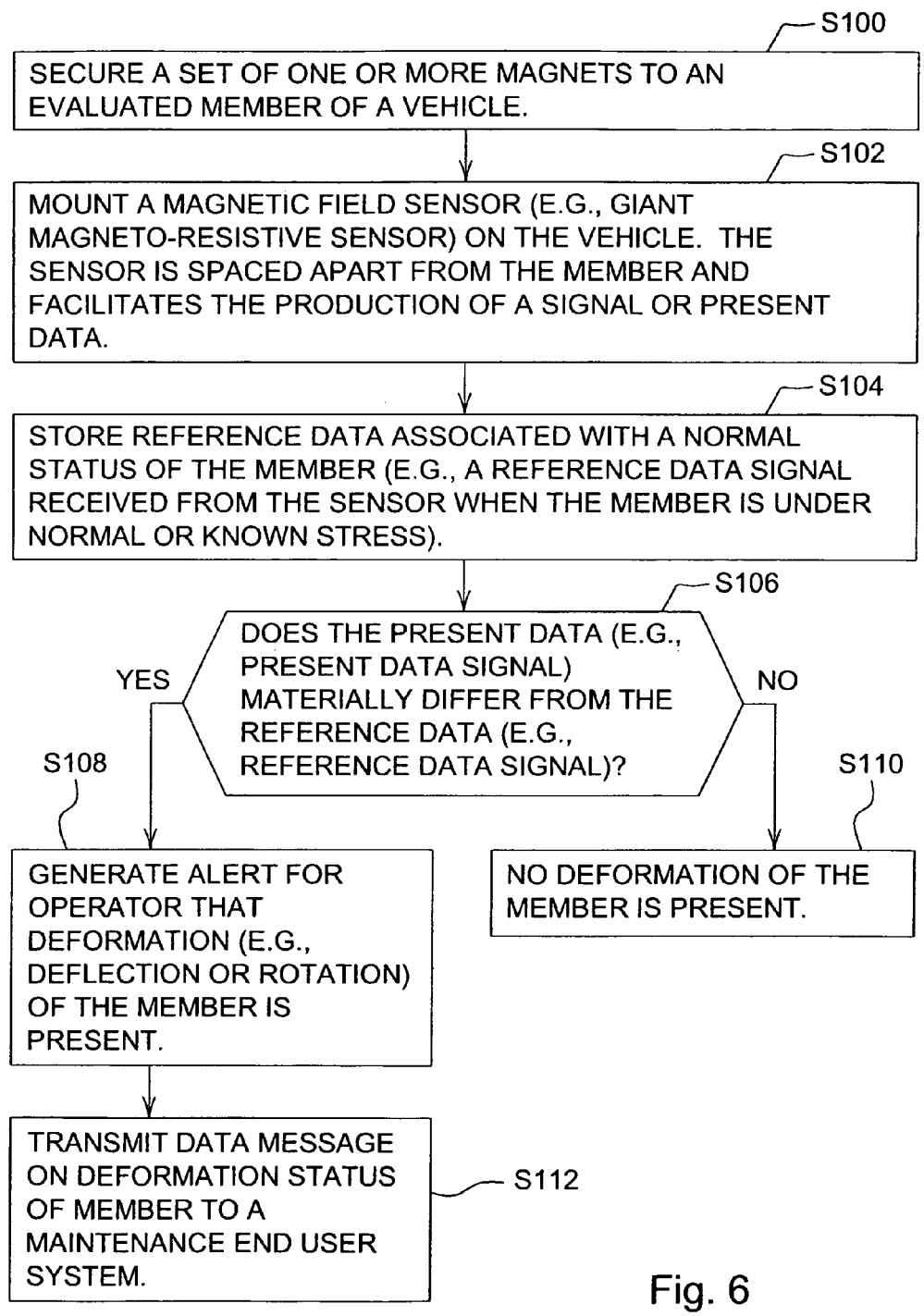
FIG. 6 is another embodiment of a method for monitoring the status of a member of a vehicle.

The method of FIG. 6 is similar to the method of FIG. 5, except the method of FIG. 6 further includes step S112 after step S108. Like reference numbers in FIG. 5 and FIG. 6 indicate like steps or procedures.

In step S112, a communications interface 130 and a wireless communications device 132 transmit a data message on deformation status of a member to a maintenance end user. For example, the transmitted data message is received at a base station 34, where the base station 34 sends the status message to the maintenance end user system 42 via the communications network 40 (e.g., Internet.) The base station 34 or the communications system 36 may covert or format the data into a data packet message suitable for transmission over the communications network 40.

Figure 7:
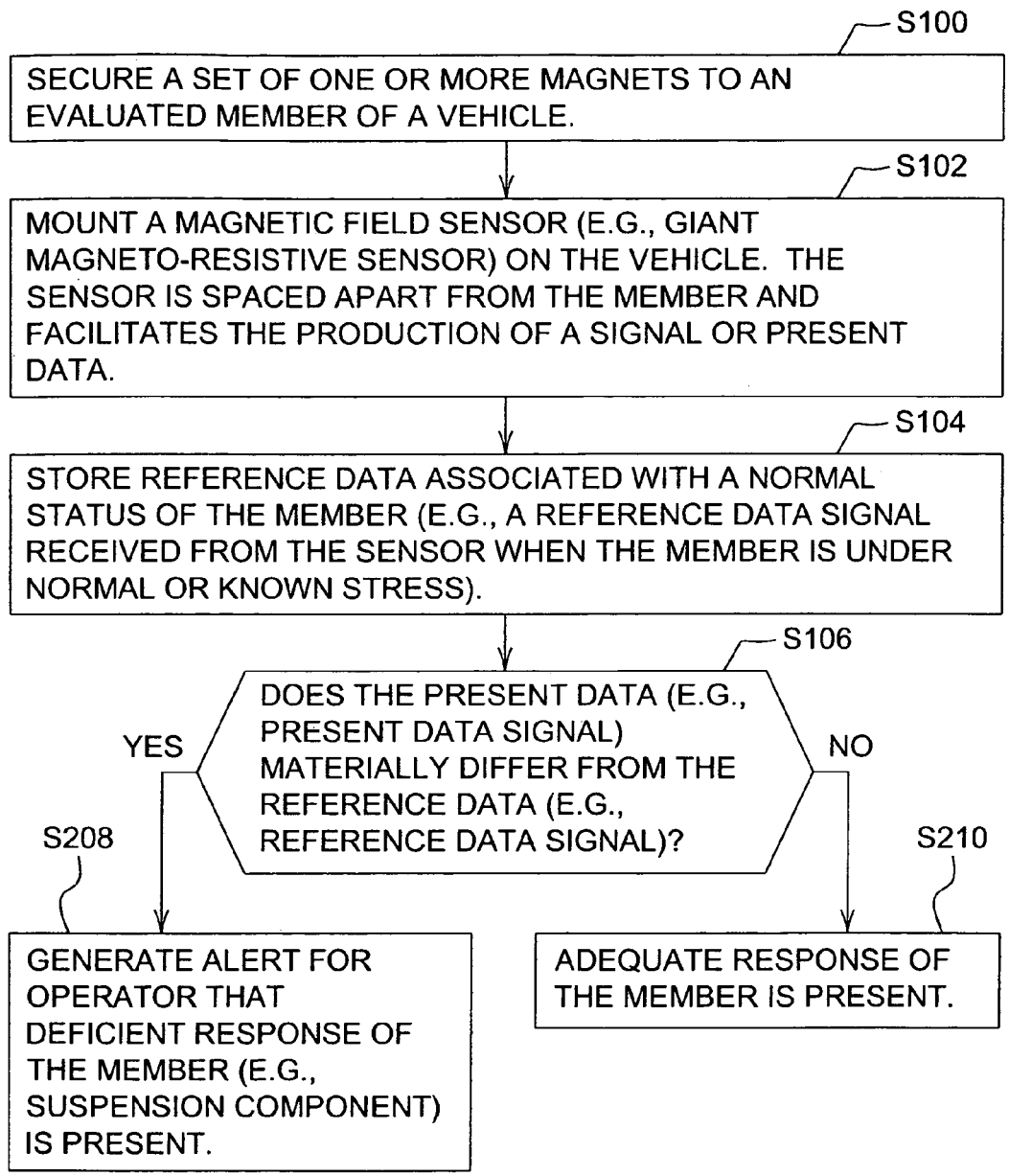
FIG. 7 is yet another embodiment of a method for monitoring the status of a member of a vehicle.

The method of FIG. 7 is similar to the method of FIG. 5, except the method of FIG. 7 replaces steps S108 and S110 with steps S208 and S210, respectively. Further, steps S104 and S106 may be explained with reference to monitoring of the machine health or performance status of suspension components as members 22, as opposed to the general description of those steps in FIG. 5.

In step S104, a data processor 14 stores reference data in the storage device 16 on a normal or known response of the suspension component.

In step S106, the data processor 14 determines whether the present data materially differs from the reference data. For example, the data processor 14 determines whether the present response of the suspension component materially differs from the normal or known response of the suspension component. If the data processor 14 determines that the present response of the suspension component materially differs from the normal or known response, the method continues with step S208. However, if the data processor 14 determines that the present response of the suspension component does not materially differ from the normal or known response, the method continues with step S210.

In step S208, the data processor 14 or the interface 26 generates an alert or alarm signal or data for the operator that a deficient response of the member 22 (e.g., suspension component) is present. The alert device 28 may provide an audible or visual alarm or alert to the operator of the vehicle consistent with the alert or alarm signal or data.

In step S210, an adequate response of the member 22 (e.g., suspension component) is present. Accordingly, no alert or alarm signal or data is generated. However, in an alternate configuration, the data processor 14 or the interface 26 may generate a normal status or status indicating the absence of any alert or alarm for the alert device 28.

Having described the preferred embodiment, it will become apparent that various modifications can be made without departing from the scope of the invention as defined in the accompanying claims.

The invention claimed is:

1. A system for monitoring a status of a member of a vehicle, the system comprising:
  a member;
  a set of one or more magnets secured to the member;
  a magnetic field sensor mounted on a vehicle, spaced apart from the member, and facilitating production of a sensor signal;

a data processor receiving the sensor signal from the magnetic field sensor and detecting at least one of a movement and present deformation of the member with respect to the vehicle;

the member comprises a suspension component with a measured damping response defined in terms of measured amplitude versus time and detectable by the sensor;

a storage device storing a reference damping response for the suspension component; and the data processor determining that the suspension member is deficient if the measured attenuation response of the suspension component is deficient with respect to the reference attenuation response in damping rate, frequency, or amplitude.

2. The system according to claim 1 wherein the sensor signal varies based on a corresponding change in a relative position or separation of the sensor with respect the set of magnets on the member.

3. The system according to claim 1 wherein the member comprises a frame of the vehicle or a structural portion of a vehicle of unibody construction.

4. The system according to claim 1 wherein the member comprises an axle of the vehicle.

5. The system according to claim 1 wherein the set of magnets are arranged radially about a central axis to facilitate measuring of a rotational speed of a shaft of the vehicle.

6. The system according to claim 1 further comprising:
a storage device associated with the data processor, the storage device storing reference data on at least one of a historical deflection, historical deformation, a historical movement, a historical rotation, a reference deflection, a reference deformation, a reference movement, a reference rotation, an as-designed position of the member with respect to the sensor, and an as-manufactured position of the member with respect to the sensor.

7. The system according to claim 6 wherein the data processor determines that a member is exposed to a greater degree of mechanical stress or loading than desired if the present deflection exceeds the reference deflection.

8. The system according to claim 6 wherein the data processor determines that a member is exposed to a greater degree of mechanical stress or loading than desired if the present rotation exceeds the reference rotation.

9. The system according to claim 1 further comprising:
a wireless communications device for communicating an electromagnetic signal;
a communications interface associated with the data processor and coupled to the wireless communications device.

10. The system according to claim 1 wherein the magnetic field sensor comprises a sensor selected from the group consisting of a giant magneto resistive sensor and a Hall effect sensor.

11. The system according to claim 1 further comprising:
an interface in communication with the data processor;
an alert device for alerting an operator of the vehicle of the status of the member based on at least one of a movement and present deformation of the member with respect to the vehicle, the alert device coupled to the interface.

12. A method for monitoring a status of a member of a vehicle, the method comprising:
securing a set of one or more magnets to the member;
mounting a magnetic field sensor on the vehicle, the magnetic field sensor spaced apart from the member and facilitating production of a sensor signal;

detecting at least one of a present deformation and movement of the member with respect to the vehicle based on the sensor signal received from the magnetic field sensor;
storing a reference damping response for a suspension component as the member; and
determining that the suspension member is deficient if a measured attenuation response of the suspension component during the detecting is deficient with respect to the reference attenuation response in damping rate, frequency, or amplitude.

13. The method according to claim 12 wherein the sensor signal varies based on a corresponding change in a relative position or separation of the sensor with respect the set of magnets on the member.

14. The method according to claim 12 wherein the member comprises a frame of the vehicle or a structural portion of a vehicle of unibody construction.

15. The method according to claim 12 wherein the member comprises an axle of the vehicle.

16. The method according to claim 12 wherein the set of magnets are arranged radially about a central axis to facilitate measuring of a rotational speed of a shaft of the vehicle.

17. The method according to claim 12 further comprising:
storing reference data on at least one of a historical deflection, historical deformation, a historical movement, a historical rotation, a reference deflection, a reference deformation, a reference movement, a reference rotation, an as-designed position of the member with respect to the sensor, and an as-manufactured position of the member with respect to the sensor.

18. The method according to claim 17 wherein the detecting further comprises determining that a member is exposed to a greater degree of mechanical stress or loading than desired if the present deflection exceeds the reference deflection.

19. The method according to claim 17 wherein the detecting further comprises determining that a member is exposed to a greater degree of mechanical stress or loading than desired if the present rotation exceeds the reference rotation.

20. The method according to claim 12 further comprising:
communicating a need or demand for a replacement component over a communications network.

21. The method according to claim 12 wherein the magnetic field sensor comprises a sensor selected from the group consisting of a giant magneto resistive sensor and a Hall effect sensor.

22. The method according to claim 12 further comprising:
alerting an operator of the vehicle of the status of the member based on at least one of a movement and present deformation of the member with respect to the vehicle.

23. A system for monitoring a status of a member of a vehicle, the system comprising:
a member;
a set of one or more magnets secured to the member;
a magnetic field sensor mounted on a vehicle, spaced apart from the member, and facilitating production of a sensor signal;
a data processor receiving the sensor signal from the magnetic field sensor and detecting at least one of a movement and present deformation of the member with respect to the vehicle, and determining that the member is exposed to a greater degree of mechanical stress or loading than desired if the present deflection exceeds a reference deflection; and a wireless communication device for sending a message to a remote maintenance system indicating that the member has mechanical stress or more loading than desired.

24. The system of claim 23 wherein the data processor determines that the member is exposed to a greater degree of mechanical stress or loading based on stored data of at least one of i) as-manufactured member motion parameters, and ii) a history of in use motion measurements for the member.

25. The system of claim 23 wherein in response to the message the maintenance system performs at least one of i) orders applicable repair parts, ii) monitors warranty compliance, and iii) predicts a demand for parts.

26. A method for monitoring a status of a member of a vehicle, the method comprising:

securing a set of one or more magnets to the member;

mounting a magnetic field sensor on the vehicle, the magnetic field sensor spaced apart from the member and facilitating production of a sensor signal;

detecting at least one of a present deformation and movement of the member with respect to the vehicle based on the sensor signal received from the magnetic field sensor;

determining that the member is exposed to a greater degree of mechanical stress or loading than desired if the present deflection exceeds a reference deflection; and wirelessly sending a message to a remote maintenance system indicating that the member has mechanical stress or more loading than desired.

27. The method of claim 26 wherein the determining is based on stored data of at least one of i) as-manufactured member motion parameters, and ii) a history of in use motion measurements for the member.

28. The method of claim 26 wherein in response to sending the message the maintenance system performs at least one of i) orders applicable repair parts, ii) monitors warranty compliance, and iii) predicts a demand for parts.

* * * * *